United States Patent [19]

Wong et al.

[11] 4,451,533
[45] May 29, 1984

[54] DISPENSABLE POLYPROPYLENE ADHESIVE-COATED TAPE

[75] Inventors: Roy Wong, White Bear Lake; James J. Pedginski, Stillwater; Andrew H. Wong, Woodbury, all of Minn.

[73] Assignee: Minnesota Mining and Manufacturing Company, St. Paul, Minn.

[21] Appl. No.: 465,162

[22] Filed: Feb. 9, 1983

[51] Int. Cl.³ .......................... B32B 27/06; C09J 7/02
[52] U.S. Cl. .................................... 428/337; 264/214; 264/288.4; 264/290.2; 428/343; 428/349; 428/523; 428/913
[58] Field of Search ............... 428/343, 523, 349, 337, 428/913; 264/288.4, 290.2, 210.7, 214

[56] References Cited

U.S. PATENT DOCUMENTS 3,732,122 5/1973 Christensen ........................ 428/343
4,045,515 8/1977 Isaka et al. ........................ 264/210.7
4,134,957 1/1979 Yoshimura et al. .............. 264/288.4
4,137,362 1/1979 Miki et al. ....................... 428/343 X

FOREIGN PATENT DOCUMENTS 56-51329 5/1981 Japan .............................. 264/288.4

Primary Examiner—Thomas J. Herbert, Jr.
Attorney, Agent, or Firm—Donald M. Sell; James A. Smith; William L. Huebsch

[57] ABSTRACT

A tape comprising a polypropylene backing coated on one surface with an adhesive. The backing is biaxially oriented to provide a secant modulus of elasticity measured at one percent elongation in its longitudinal direction of at least about $25 \times 10^5$ kilopascals, will break before it can be stretched in its longitudinal direction by about 55 percent and can be transversely cut by forces of less than about 13 newtons on the cutters of commercially available tabletop tape dispensers.

13 Claims, 6 Drawing Figures

DISPENSABLE POLYPROPYLENE ADHESIVE-COATED TAPE

TECHNICAL FIELD

This invention relates to tapes comprising a layer of adhesive on a polypropylene backing.

BACKGROUND ART

Polyproplene film has long been recognized as a good backing for adhesive-coated tapes due to its low cost and due to the strength and toughness that can be developed in such film by orienting the film during manufacture. Known prior art adhesive-coated tapes made with polypropylene film backings, however, have not been easy to cut transversely by manually pulling them against teeth on the type of dispensing blade normally provided on tabletop dispensers of the type found in homes, offices or factories (e.g., such as the dispensing blade provided on the Scotch Brand Model C-40 or C-15 Tabletop Dispenser available from Minnesota Mining and Manufacturing Company of St. Paul, Minnesota), particularly after the teeth on such a dispensing blade have become dulled because of use or damage.

Thus, while the use of pressure-sensitive adhesive-coated tapes made with biaxially oriented polypropylene backings has been found commercially acceptable where the tapes can be applied to boxes or the like by factory equipment which includes extremely sharp knives or scissors-like mechanisms for cutting the tapes, such tapes have not been found commercially acceptable for more general uses where it is desired to manually dispense them from a tabletop dispenser. Instead tapes having backings made of unplasticized polyvinylchloride, cellophane, or cellulose acetate are in such general use because of the ease and precision with which they can be manually cut by the dispensing blade on such a tabletop dispenser (i.e., such backings are not significantly stretched over the dispensing blade, the teeth on the dispensing blade produces a serrated cut edge on the backing closely corresponding to the shape of the teeth on the cutting blade, and a force of under about 11 newtons is required to cut the tape via the dispensing blade when the tape is cut in a manner emulating the cutting test described with reference to FIGS. 2 through 5 of this application).

Prior art attempts to solve the problem of manually cutting or dispensing adhesive tapes made with biaxially oriented propylene homopolymer or copolymer backings or backings made from a polypropylene and polyethylene blend are described in U.S. Pat. Nos. 4,045,515 and 4,137,362. Generally these attempts involve orienting or stretching the backing much more in its transverse direction than in its longitudinal direction during manufacture (e.g., 7.5 times in its transverse direction as opposed to only 1.2 times in its longitudinal direction). Such unbalanced stretching causes the backing to form transverse fiber-like portions between which the backing can be easily torn by hand. Some such tapes have additionally been provided with at least one rough edge that provides notches to help initiate such tearing. Such tapes, however, are too easily stretched in their longitudinal direction so that they may not provide desired strength characteristics during use. Also, such tapes cannot be easily manually cut on the dispensing blades used on the types of tabletop dispensers described above, but rather are only notched by such blades and are then torn apart between the fiber-like portions which may or may not be aligned with the cutting edge of the blade. This can be a disadvantage when a precise cut along the cutting edge of the dispensing blade is desired.

While it has been known that polypropylene films with high strengths can be made by stretching the films first in a first or longitudinal direction, then in a second or transverse direction, and then again in the first longitudinal direction to produce a strong film commonly used for packaging (see U.S. Pat. No. 4,134,957, and Japanese Patent Specification No. 51,329/81), heretofore it has apparently been assumed that such polypropylene films would be even more difficult to sever than would the polypropylene films already in use as the backings for tapes.

DISCLOSURE OF THE INVENTION

The present invention provides a tape comprising a layer of adhesive coated on a biaxially oriented polypropylene film backing which can be easily and precisely manually cut on the type of dispensing blades used on the commercially available tabletop dispensers described above.

Surprisingly, applicants have discovered that when polypropylene film is first stretched in a first or longitudinal direction and stretched in a second or transverse direction, and is then again stretched in the first direction to increase its strength above normally obtained levels, and the film is then used as the backing for an adhesive coated tape, that tape is easily manually transversely cut and dispensed via the dispensing blades on the types of tabletop dispensers described above with forces of less than about 13 newtons when tested on the device and according ot the method described herein with reference to FIGS. 2 through 5 of the drawing.

To provide such desirable cutting or dispensing characteristics for the tape, the polypropylene backing included in the tape should have a secant modulus of elasticity measured at one percent (1%) elongation in its first or longitudinal direction of at least about $25 \times 10^5$ kilopascals and should break before it can be stretched in its first or longitudinal direction by about fifty-five percent (55%). Preferably, for best dispensing, the backing should have a secant modulus of elasticity measured at one percent (1%) elongation of at least about $50 \times 10^5$ kilopascals in its first or longitudinal direction and should break before it can be stretched in its longitudinal direction by about eleven percent (11%). Also, the backing should have enough orientation in its transverse direction to prevent longitudinal fibrillation. Biaxially oriented polypropylene backing films as described above having a secant modulus of elasticity measured at one percent (1%) elongation of at least about $14 \times 10^5$ kilopascals in their transverse direction and which can be stretched by over about forty percent (40%) in their transverse direction before breaking have been found not to have such fibrillation.

Polypropylene tape backings having the above physical properties have been made from homopolymeric isotactic propylene resins having melt flow indices in the range of 0.7 to 4.0. It is expected that such tape backings could also be made from resins having melt flow indices outside that range, or from blends of polypropylene resins which may have different melt flow indices, or from copolymers or mixtures of polypropylene and other resins so long as the great majority of such resins is polypropylene (e.g. over about 85% polypropylene). It is further expected that various fillers and/or additives known in the art could also be added to the polypropylene backing for various purposes such as to provide color, antioxidants, etc. Thus, "polypropylene" as used herein to refer to tape backings shall be interpreted to include such other resins, blends, mixtures, fillers and additives.

The thickness of the polypropylene tape backing should be in the range of about 0.0013 to 0.005 cm with the lower limit being determined by the backing thickness at which tape made from the backing becomes too flimsy and hard to handle, and the upper limit being the backing thickness at which tape made from the backing is too rigid and hard to manually dispense. Tape backings within a thickness range of about 0.0025 to 0.0041 centimeters are preferred for the feel, flexibility, strength and dispensing characteristics of tape that can be made from them.

The adhesives coated on the backing to form the tape may be activatable by pressure, heat or both and may be of any conventional type such as acrylate, rubber resin or silicone. The adhesive may be applied at conventional coating weights (e.g., 0.0017 to 0.0034 grams per square centimeter). The use of exceptionally high coating thicknesses of adhesive on the polypropylene backing (e.g., over 0.004 centimeters) to form a tape has been found to adversely effect the dispensing properties of that tape compared to a tape with the same backing and a lower coating thickness of the same adhesive.

The polypropylene backing may, optionally, be treated with a conventional primer, or by flame, or corona discharge, or other surface treatments to enhance the adhesion of the adhesive to the backing, and the surface of the backing opposite the adhesive layer may be treated with conventional materials known as low adhesion backsizes (LAB's) which restrict adhesion of the adhesive layer to that surface when the tape is wound in a coil, all as is well known in the adhesive-coated tape-making art.

Generally, biaxially oriented polypropylene film having the desired dispensing characteristic described above can be made by (1) casting a polypropylene sheet; (2) orienting the cast sheet in a direction that will become the longitudinal direction of the backing by stretching the sheet in that direction by a factor of between 3 to 7 times its original length dimension and orienting the sheet in the direction that will become the transverse direction of the backing by stretching the sheet in that direction by a factor of between 3 to 10 times its original width dimension (which orientations can be done sequentially or simultaneously); and (3) again stretching the sheet one or more times in the direction that will become the longitudinal direction of the backing to produce a total stretching factor of 1.5 to 5 times with respect to its length after the first longitudinal and transverse stretching. Such stretchings of a sheet can be done continuously on commercially available equipment, as is known in the art.

BRIEF DESCRIPTION OF THE DRAWING

The present invention will be further described with reference to the accompanying drawing wherein like numbers refer to like parts in the several views, and wherein.

DETAILED DESCRIPTION

Figure 1:
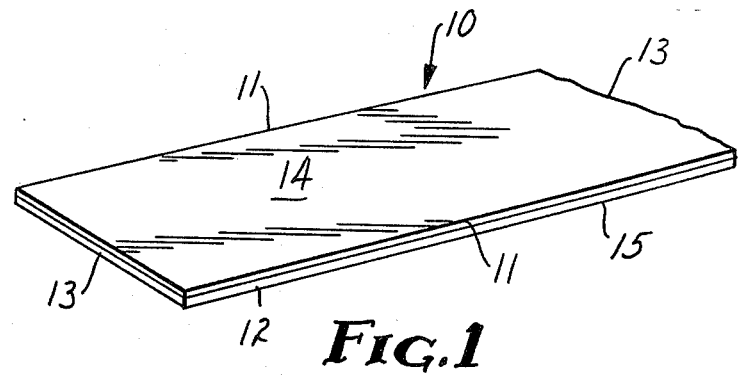
FIG. 1 is an enlarged perspective view of a length of tape according to the present invention.
Figure 2:
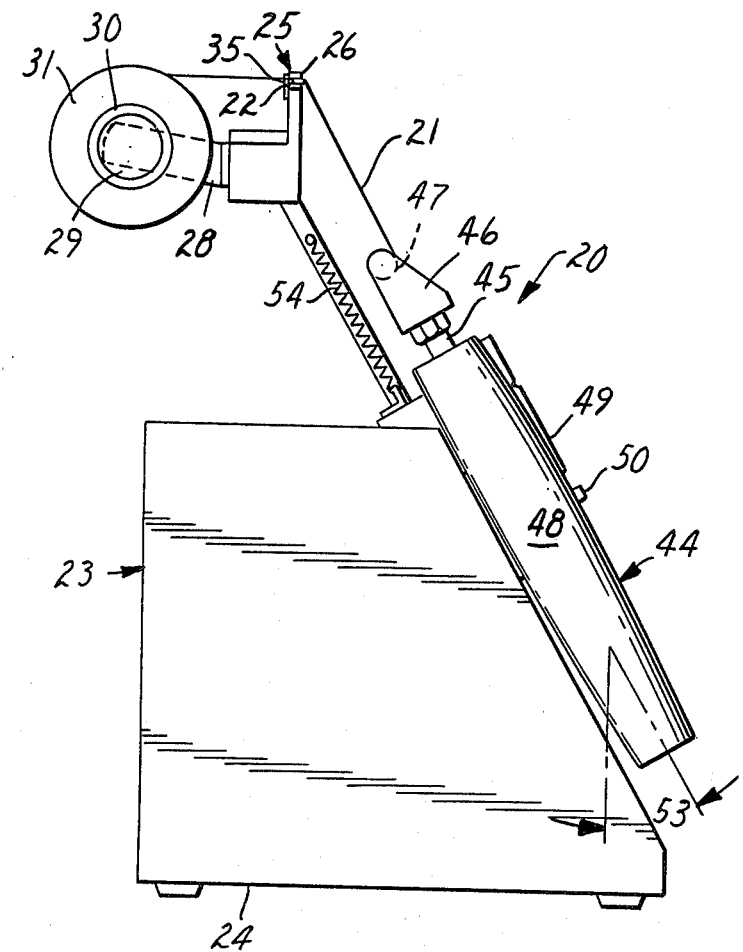
FIG. 2 is a vertical side view of a test fixture used to test the dispensing characteristics of tape according to the present invention.
Figure 3:
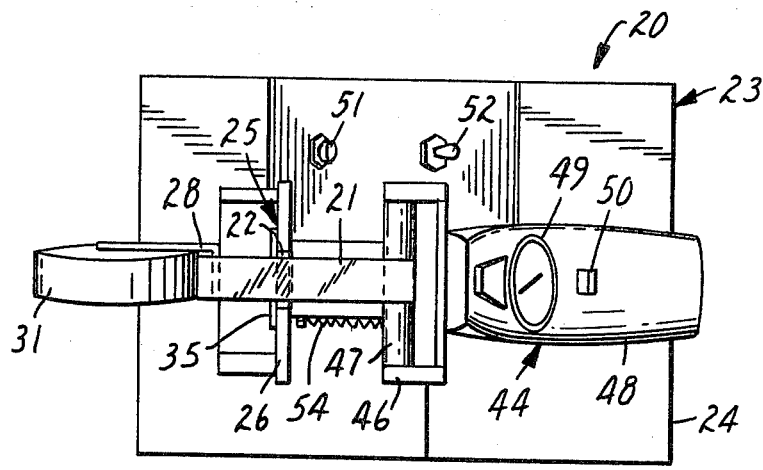
FIG. 3 is a top view of the test fixture of FIG. 2.
Figure 4:
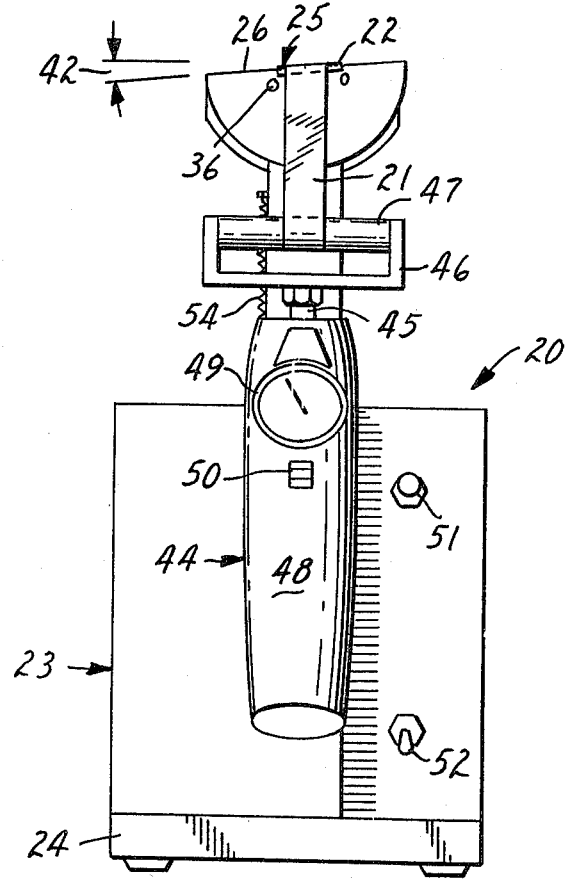
FIG. 4 is a vertical front view of the test fixture of FIG. 2.
Figure 5:
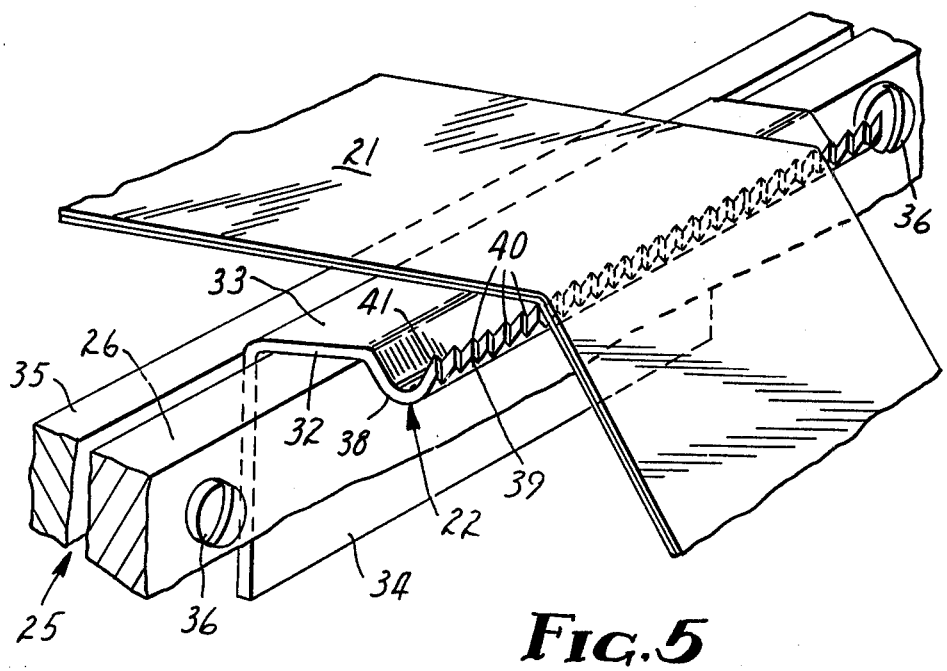
FIG. 5 is an enlarged perspective view of a cutting blade used in the test fixture of FIGS. 2 through 4.

Referring now to FIG. 1 there is shown a length of tape according to the present invention, generally designated by the reference numeral 10, which tape 10 has good strength while being easily manually dispensable by cutting it transversely on the cutting blades of commercially available tabletop dispensers of the type described above.

Generally the tape 10 comprises a biaxially oriented polypropylene backing layer 12 which has a thickness in the range of about 0.0013 to about 0.005 centimeters, has a secant modulus of elasticity measured at one percent (1%) elongation in its first or longitudinal direction parallel to its edges 11 of over about $25 \times 10^5$ kilopascals, will break before it is longitudinally stretched by about fifty five percent (55%); and has sufficient orientation in its second or transverse directions parallel to its edges 13 to minimize fibrillation in its first direction. The backing layer 12 is coated on one side with a layer 14 of adhesive which may be any of a number of known adhesives, and may have a low adhesion backsize material coated on its surface 15 opposite the adhesive.

The tape 10 is illustrated as being elongate in its first direction, however, for certain purposes, a cut length of the tape 10 could have a longer dimension in its second direction than in its first direction, such as where very wide, transparent tape (e.g., 15 centimeters wide) is cut in lengths shorter than its width for use to cover shipping labels, etc. In either event, the tape 10 is intended to be cut in its second direction and transverse to its first direction, and is easily manually cut in its second direction on the types of cutting blades typically used in tabletop dispensers.

Test Device

FIGS. 2, 3, 4, and 5 illustrate a device 20 for testing the ease and precision with which a tape 21 (such as the tape 10 described in this application) can be cut on or dispensed over a new cutting blade 22 of the type presently used on the model C-15 or model C-40 tape dispenser sold by Minnesota Mining and Manufacturing Company of St. Paul, Minnesota.

The device 20 comprises a frame 23 including a base portion 24 adapted to be supported on a horizontal surface, a vise-like clamp 25 adapted to fix the blade 22 over an upper edge surface 26 of the frame 23, which edge surface 26 is inclined at about 10 degrees to the horizontal, a projecting bracket 28 on which is rotatably mounted a hub 29 adapted to support a core 30 for a roll 31 of the tape 21 to be tested with the axis of rotation for the hub 29 generally parallel to the upper edge surface 26, and means for pulling on the tape 21 at a predetermined angle to sever the tape 21 on the blade 22 and for recording the force required to sever the tape 21.

The blade 22 (FIG. 5), which is formed of about 0.053 centimeter thick nickel plated steel, includes (1) a rectangular land portion 32 at least as wide as the tape 21 and about 0.4 cm long in the direction corresponding to the longitudinal direction of the tape 21 extending across the blade 22, which land portion 32 defines a generally planar upper land surface 33 to which the adhesive coating of the tape 21 can be temporarily adhered, (2) a support portion 34 at one edge of and disposed at a right angle to the land portion 32, which support portion 34 is held between a plate 35 and the frame 23 via screws 36 (which plate 35 and screws 36 are included in the clamp 25) with the lower surface of the land portion 32 against the upper edge surface 26, and a (3) generally U-shaped portion 38 at the edge of the land portion 32 opposite the support portion 34 which has a row of teeth 39 along its distal edge. Each tooth 39 (1) is generally triangular, (2) has a tip in or slightly lower than the plane of the land surface 33 and spaced from the tips of adjacent teeth 39 by about 0.1 cm, (3) is defined by the intersection of distal surfaces 40 of the U-shaped portion 38 (which surfaces 40 are disposed at right angles to the land surface 33) with the upper surface 41 of the U-shaped portion 38 (which upper surface 41 is disped at an angle of about 120 degrees with respect to the land surface 33) and (4) has a distal tip angle measured in the plane of the land surface 33 of about 90 degrees.

The land surface 33 is adapted to have the adhesive coating of the tape 21 temporarily adhered thereto to restrain forward motion of the adhered portion of the tape 21 during severing of the tape 21 by the teeth 39. (Alternatively, a tape to be tested could be clamped to the land surface 33 if the adhesive on that tape was not pressure sensitive.) The blade 22 is positioned over the upper edge surface 26 of the frame 23 and fixed in the clamp 25 so that the plane defined by the tips of the teeth 39 and the land surface 33 is disposed at an angle 42 of about 10 degrees (FIG. 4) with respect to the horizontal.

The means for pulling the tape 21 at a predetermined angle to sever it against the teeth 39 and for recording the force required to sever the tape 21 includes a force gauge 44 of the type known as a 10 pound by 0.1 pound Chatillion gauge, which is commercially available as the model DPP-10 gauge from John Chatillion and Sons, Inc. of Kew Gardens, New York. The force gauge 44 includes an axially movable plunger 45 which has on one end a yoke 46 supporting a cylindrical tape adhesion member 47 at its ends, which adhesion member 47 has its axis disposed transverse to the axis of the plunger 45 with a tangent to its periphery aligned with the axis of the plunger 45. The end of the plunger 45 opposite the yoke 46 is mounted for axial sliding movement within a case 48 for the gauge 44 and is coupled to a mechanism within the case 48 that will record outward force applied to the plunger 45 on a dial 49 and will maintain a reading on the dial 49 corresponding to the maximum force applied to the plunger 45 until that dial reading is released by moving a release button 50. The case 48 of the force gauge is mounted on the frame 23 by a mechanism (not shown) which can be operated by switches 51 and 52 to move the case 48 of the force gauge 44 along a path aligned with the axis of the plunger 45 from an initial test position to a final test position with the case 48 moving away from the blade 22 at the constant speed of 0.76 meter per minute; and will allow the case 48 to be subsequently returned to its initial position under the influence of a spring 54. The path of movement for the plunger 45 is disposed at an angle 53 (FIG. 2) of about 30 degrees with respect to the vertical, is parallel to and half way between planes defined by the edges of the tape 21 adhered to the land surface 33, and is aligned with the teeth 39 on the blade 22.

To test the force required to cut a particular tape 21, a roll 31 of the tape 21 is mounted on the hub 29 of the device 20. A length of the tape 21 is pulled off of the roll 31, positioned around the blade 22, adhered to the planar land surface 33, and has its end adhered smoothly on the tape adhesion member 47 with the tape extending around but not being tensioned against the teeth 39 on the blade 22. The drive mechanism is then activated via the switches 51 and 52 to move the case 48 from its initial toward its final position, which movement, because of the angle at which the teeth 39 are tilted, causes tension to be applied to the tape 21 extending over the teeth 39 between the land surface 33 and the tape adhesion member 47 beginning at one edge so that the tape 21 is progressively transversely severed by the teeth 39. The force required to sever the tape 21 along the teeth 39 is recorded on the dial 49, which dial 49 will retain the highest force reading produced during the test.

To provide an example of the dispensing characteristics of a commercially available pressure-sensitive adhesive tape against which other tapes could be compared, tests were performed via the device 20 on a pressure-sensitive tape made with a cellophane film backing which is commercially available as Highland ® Brand 5910 tape from Minnesota Mining and Manufacturing Company, St. Paul, Minnesota. This tape is considered to be a moderately easy tape to manually dispense from a tabletop dispenser of the type described above. The cutting force for the Highland ® Brand 5910 Tape was about 10.7 newtons. The tape did not stretch noticeably, cut precisely along the teeth to produce a serrated cut edge on the dispensed tape and the severed length of the tape was not distorted adjacent its newly cut edge.

Examples and Test Results

The following describes making and testing the physical properties and dispensing characteristics of eight Examples of pressure-sensitive adhesive tapes according to the present invention, and making and testing the physical properties and dispensing characteristic of a tape with a polypropylene backing which does not have the physical properties needed for a tape according to the present invention. Data from such testing and additional physical properties of those tapes are shown in the following Table for ease of comparison, together with the dispensing characteristics for the Highland ® Brand 5910 tape with which the dispensing characteristics of those tapes can be compared. Ten tests were made to determine each value for the physical properties listed in the Examples and Table for the finished film that was used for the backing of the tape made in each Example (except for its thickness), and to determine each value listed in the Examples and Table for the tape cutting force. The data from those tests were analyzed in accordance with standard statistical methods to determine the average values listed, and the standard deviations for most of the average values determined are noted in the Examples. Where average values from or derived from such tests are recited in the claims, such average values should be interpreted as incorporating the standard deviation resulting from the tests by which they were obtained and should be compared only against average values obtained in a similar manner.

TABLE

| Examples | Thickness of the Finished Film (cm.) | Finished Film Elongation in the Longitudinal Direction at Break (%) | Finished Film Secant Modulus of Elasticity at 1% Elongation in the Longitudinal Direction (kilopascals × $10^5$) | Finished Film Break Strength in Longitudinal Direction (kilopascals × $10^4$) | Finished Film Elongation in the Transverse Direction at Break (%) | Tape Cutting Force Using Device of FIGS. 2,3, 4&5 (newtons) |
|---|---|---|---|---|---|---|
| Highland ® Brand 5910 Tape | 0.0036 | N.A. | N.A. | N.A. | N.A. | 10.7 |
| Example 1 | 0.0039 | 52.4 | 29.9 | 21.8 | 52.6 | 10.4 |
| Example 2 | 0.0033 | 40.4 | 34.9 | 35.0 | 92.8 | 8.9 |
| Example 3 | 0.0035 | 25.8 | 32.4 | 28.1 | 115.0 | 8.6 |
| Example 4 | 0.0039 | 11.2 | 50.6 | 35.5 | 270.0 | 8.1 |
| Example 5 | 0.0039 | 10.2 | 49.1 | 29.5 | 145.0 | 7.6 |
| Example 6 | 0.0026 | 27.0 | 27.6 | 13.2 | 119.0 | 8.7 |
| Example 7 | 0.0026 | 15.0 | 33.1 | 16.6 | 90.0 | 7.9 |
| Example 8 | 0.0050 | 44.2 | 27.6 | 28.7 | 120.0 | 10.3 |
| Comparative Example | 0.0043 | 170.0 | 10.2 | 11.5 | 15.0 | 33.5 |

N.A.: Not Applicable

EXAMPLE 1

A polypropylene film was prepared by a process known as the tenter process. A propylene isotactic homopolymer resin having a nominal melt flow index of 2 obtained from Arco Chemical Co., Philadelphia, Pa. was fed into the feed hopper of a single screw extruder having an extruder barrel temperature adjusted to produce a stable homogeneous melt. The polypropylene melt was extruded through a flat sheet die onto a rotating casting wheel which had 60° C. water circulating through it. The casting wheel carried the cast sheet of polypropylene through a quenching water bath maintained at 30° C. at a speed adjusted to produce a 0.19 cm thick cast sheet. The cast sheet was then passed over a first series of heating rolls maintained internally at about 127° C. to 136° C. and then stretched between two nipped drawing rolls rotating at different speeds to attain a first draw ratio of 5.0:1 in the direction that would eventually be the first, or longitudinal, or machine direction of the film and tape produced. The longitudinally oriented sheet was then fed into a tenter with multiple heat zones having temperatures ranging from 159° C. to 175° C. and oriented in its second, or transverse, or cross direction between two tenter rails at a draw ratio of 8.85:1. The resulting 0.005 centimeter thick film was annealed in air at a temperature of 169° C., corona treated on both sides, edge trimmed and wound into a master roll.

In another separate operation, film from the master roll was passed over a series of heating rolls maintained internally at about 111° C. to 136° C. and subsequently stretched longitudinally at a draw ratio of 1.6:1, which due to elongation and transverse shrinkage of the film, resulted in a finished film to the 0.0038 to 0.004 cm thickness range. This finished film was wound into a roll.

Portions of the finished film from the roll were then coated on one side with a polyvinyl carbamate low adhesion backside (LAB) of the type described in U.S. Pat. No. 2,532,011 (incorporated herein by reference) and were coated on the other side with 0.0021 grams per square centimeter of a 95.5/4.5 isoocytl acrylate/acrylic acid (IoA/AA) copolymer pressure-sensitive adhesive of the type described in U.S. Pat. No. Re 24,906 (incorporated herein by reference). The resulting pressure-sensitive adhesive (PSA) tape was wound into a jumbo roll. Tape from the jumbo roll was then slit into 1.27 centimeter widths and wound on 2.54 centimeter diameter cores for testing.

Samples of the finished film from the roll were tested for physical properties including: (1) percentage elongation in the longitudinal direction within which the film will break, which percent elongation was measured in accordance with Method A of ASTM D 882-80a except that the jaws for stretching the film was initially spaced at 10.16 cm, jaw separating speeds of 5.08 cm/minute were used for the first 6% of stretching, and jaw separating speeds of 25.4 cm/minute were used thereafter, and the force at break was recorded; and (2) secant modulus of elasticity in the longitudinal direction measured at 1% elongation of the film which was measured according to ASTM D 882-80a except that the initial jaw separation and rate of jaw separation were as indicated above. Likewise the same properties were measured in the transverse direction of the finished film. Samples of the tape wound on the cores were tested for its dispensing characteristic using the device and method described above with reference to FIGS. 2, 3, 4 and 5. The test data was tabulated and analyzed in accordance with standard statistical methods. The results obtained are shown in the above Table.

The percentage elongation of the finished film in the longitudinal direction was about 52.4% (standard deviation 5.7%) which is a very low value for polypropylene film, and the secant modulus of elasticity at 1% elongation and the break strength for the finished film in the longitudinal direction were about $29.9 \times 10^5$ kilopascals (standard deviation $1.5 \times 10^5$ kilopascals) and $21.8 \times 10^4$ kilopascals (standard deviation $0.7 \times 10^4$ kilopascals) respectively, which are very high values for polypropylene film. The cutting force was about 10.4 newtons (standard deviation 2.1 newtons) which is about the same as the cutting force for the Highland ® Brand 5910 Tape, and is considered to be an acceptable dispensing force for manually dispensed tape. Also, like the Highland ® Brand 5910 Tape, the tape did not stretch noticeably, cut precisely along the teeth to produce a serrated cut edge on the tape, and the severed length of tape was not distorted adjacent its newly cut edge.

EXAMPLE 2

Again using the tenter process, a polypropylene film was prepared by casting a polypropylene sheet in the manner described in Example 1 except that the surface temperature of the casting wheel was maintained at about 24° C. and the speed of the casting wheel was adjusted to produce a cast sheet having a thickness of about 0.216 cm. The cast sheet was then passed over a first series of heating rolls maintained internally of about 118° C. to 127° C. and then stretched between two nipped drawing rolls rotating at different speeds to attain a first draw ratio of 5.16:1 in the direction that would become the first or longitudinal or machine direction of the film and tape produced. The longitudinally oriented sheet was then fed into a tenter with multiple heat zones having temperatures ranging from 162° C. to 168° C. and oriented in its second or transverse or cross direction between two tenter rails at a draw ratio of 6.4:1. The tentered film was then stretched between two nipped drawing rolls that were maintained internally at 163° C., which drawing rolls were rotated at different speeds to longitudinally draw the sheet for a second time at a draw ratio of 2.0:1. The resulting film was 0.0033 cm thick, was annealed at 140° C., corona treated on one side, edge trimmed and wound into a master roll.

In a separate operation, film from the master roll was corona treated on the other side thus producing a two-side corona treated finished film.

As in Example 1, the finished film was converted into a PSA tape by using the same LAB and IOA/AA adhesive. The physical properties of the finished film prior to adhesive coating and the force required to cut the tape were tested in the manners described in Example 1. The results obtained are shown in the above Table.

The percentage elongation, secant modulus of elasticity at 1% elongation and break strength for the finished film in the longitudinal direction were 40.4% (standard deviation 9.3%), 34.9×$10^5$ kilopascals (standard deviation 5.6×$10^5$ kilopascals) and 35.0×$10^4$ kilopascals (standard deviation 5.9×$10^4$ kilopascals), respectively, which reflected the greater longitudinal stretching to which the film was subjected as compared to the film in Example 1 and resulted in a cutting force for the tape of 8.9 newtons (standard deviation 2.5 newtons) which is less than that for the tape of Example 1. The tape also showed the other good dispensing characteristics shown by the tape of Example 1.

Example 3

Film and tape were produced and tested in same manner described in Example 2 except that the internal temperatures of the first series of heating rolls were increased to about 122° to 136° C., the temperatures in the multiple heating zones of the tenter were changed to about 161° to 170° C., the temperature of the two heated nipped rolls were increased to 164° C. and the second draw ratio in the longitudinal direction was increased to 2.3:1. The results obtained are recorded in the above Table.

The percentage elongation, secant modulus of elasticity at 1% elongation and break strength for the film in the longitudinal direction were 25.8% (standard deviation 6.0%), 32.4×$10^5$ kilopascals (standard deviation 1.4×$10^5$ kilopascals), and 28.1×$10^4$ kilopascals (standard deviation 4.3×$10^4$ kilopascals), respectively, which reflected the even greater longitudinal stretching to which the film was subjected as compared to Examples 1 and 2 and resulted in a cutting force for the tape of 8.6 newtons (standard deviation 2.1 newtons) that is less than that for the tape of both Examples 1 and 2. The tape also showed the other good dispensing characteristics shown by the tapes of Examples 1 and 2.

EXAMPLE 4

Again using the tenter process, a polypropylene film was prepared by casting a polypropylene sheet in the manner described in Example 1, except that the surface temperature of the casting wheel was maintained at about 36° C. and the speed of the casting wheel was adjusted to produce a 0.285 centimeter thick cast sheet. The cast sheet was then passed over a first series of heating rolls maintained internally between 107° C. and 125° C. and then stretched between two nipped drawing rolls rotating at different speeds to draw the sheet for a first time in a longitudinal direction that would become the longitudinal direction of the film and tape produced at a draw ratio of 4.3:1. The longitudinally oriented sheet was then fed into a tenter with multiple heat zones having temperatures ranging between 157° C. and 175° C. and transversely oriented between two tenter rails by transversely drawing the sheet at a ratio of 6.5:1. The tentered film was then longitudinally stretched between two nipped drawing rolls which were maintained internally at 165° C. and were rotating at different speeds to longitudinally draw the sheet for a second time at a ratio of 2.3:1. The film was then passed over an annealing drum maintained internally at 157° C., corona treated on one side, edge trimmed, and wound into a master roll.

In another operation, film from the master roll was stretched over a third series of heated idling rolls maintained at a surface temperature of 132° C. between two different sets of nipped drawing rolls rotating at different speeds to attain a third draw ratio in its longitudinal direction of 1.36:1. The intermediate film thus formed was then again wound into a roll.

The intermediate film was again passed through the process equipment described in the preceeding paragraph except that the nipped drawing rolls were rotated at different speeds to attain a fourth draw ratio of 1.19:1 in the longitudinal direction of the film. The finished film thus formed was then wound into a roll.

Tape samples were prepared from the finished film by coating about 0.002 grams per square centimeter of a 95.5/4.5 IOA/AA pressure sensitive adhesive onto the corona treated surface of the film. Physical properties were measured on the finished film prior to adhesive coating and dispense properties were measured for the tape samples after slitting in the manners described above with respect to Example 1. The results obtained are shown in the above Table.

The percentage elongation, secant modulus of elasticity at 1% elongation and break strength for the film in the longitudinal direction were 11.2% (standard deviation 1.3%), 50.6×$10^5$ kilopascals (standard deviation 5.7×$10^5$ kilopascals), and 35.5×$10^4$ kilopascals (standard deviation 2.7×$10^4$ kilopascals), respectively, which reflected the yet greater longitudinal stretching to which the film was subjected as compared to Examples 1, 2 and 3 and resulted in even a lower cutting force for the tape of 8.1 newtons (standard deviation 0.9 newton) as compared to the cutting forces of the tapes of Examples 1, 2 and 3. The tape also showed the other good dispensing characteristics shown by the tapes of Examples 1, 2 and 3.

EXAMPLE 5

Film and tape were prepared and tested in the same manner described above for Example 4 except that the propylene isotactic homopolymer resin used had a nominal melt flow index of about 0.7; the cast sheet thickness was increased to 0.305 centimeter; the internal temperature of the first series of rolls was increased to between 116° C. and 132° C.; the first longitudinal draw ratio was increased to 5.0:1; the tenter temperature range was changed to 160° C. to 168° C.; the transverse drawing ratio was increased to 7.9:1; the internal temperature of the two heated nipped rolls used in the second longitudinal draw was increased to 166° C.; the second longitudinal draw ratio was decreased to 1.7:1; the third longitudinal draw ratio was increased to 1.44:1; and the fourth longitudinal draw ratio was decreased to 1.16:1. The results obtained are shown in the above Table.

The percentage elongation, secant modulus of elasticity at 1% elongation and break strength for the film in the longitudinal direction were 10.2% (standard deviation 3.0%), $49.1 \times 10^5$ kilopascals (standard deviation $5.7 \times 10^5$ kilopascals), and $29.5 \times 10^4$ kilopascals (standard deviation $4.5 \times 10^4$ kilopascals), respectively. The tape had a cutting force of 7.6 newtons (standard deviation 1.2 newtons) which is the lowest cutting force for the tapes described in the eight examples of the present invention, and was about three fourths of the cutting force for the Highland ® Brand 5910 Tape so that the tape was considered to be easily manually dispensable. The tape also showed the other good dispensing characteristics shown by the tapes of Examples 1, 2, 3 and 4.

EXAMPLE 6

Film was prepared by a process known as the tubular process. A homopolymer isotactic polypropylene resin having a nominal melt flow index of 2 was fed into the feed hopper of a single screw extruder. The extruder barrel temperature was adjusted so as to produce a stable, homogeneous melt. The melt was extruded through an annular die to produce a molten polypropylene tube. The tube was passed over and necked down on a sizing mandrel and quenched in a water bath maintained at 14° C.

Next the side walls of the tube were pressed together into a "lay-flat" tube by a pair of nip rollers and conveyed to a first vertical stretch tower. One pair of nip rollers was positioned at the bottom end of the stretch tower and a second pair of nip rollers was positioned at its upper end. An infrared heater was positioned adjacent its upper end below the second pair of nip rollers to heat the tube to a stretching temperature. As the tube passed through the infrared heated section of the tower it was simultaneously stretched in two directions. Air entrapped in the tube between the two pairs of nip rollers controlled the stretching in the transverse direction of the tube and a difference in the speed at which the two pairs of nip rolls were rotated controlled stretching of the tube in its longitudinal direction. The factors were controlled to produce a transverse draw ratio of 3.3:1 and a longitudinal draw ratio of 4.0:1.

Next, the walls of the stretched tube were pressed together into a "lay-flat" tube and transported to a second, larger vertical stretch tower. This tower operated in a manner similar to the first except that heated forced air at 140° C. was used to heat the tube to a stretching temperature. The tube was stretched in the second stretch tower between two pairs of nipped rollers rotated at different speeds to attain a second longitudinal direction draw ratio of 1.5:1. The tube was not drawn significantly in its transverse direction.

The tube from the second tower was collapsed into a "lay-flat" tube, and slit into two films, and each film was wound into a master roll.

In separate operations, the film was corona treated on both sides, to produce finished film, and PSA tape samples were prepared from the finished film as described in Example 1. The finished film and tape were tested as described in Example 1. The results obtained are shown in the above Table.

The percentage elongation, secant modulus of elasticity at 1% elongation and break strength for the finished film in the longitudinal direction were 27% (standard deviation 12.0%), $27.6 \times 10^5$ kilopascals (standard deviation 0), and $13.2 \times 10^4$ kilopascals (standard deviation $0.6 \times 10^4$ kilopascals), respectively, (which values are comparable to the values obtained in Example 3). The tape had a cutting force of 8.7 newtons (standard deviation 1.9 newtons) and also showed the other good dispensing characteristics shown by the tapes of the first 5 Examples. This Example showed that the properties of the tape are not dependent on the process (i.e., tenter process or tubular process) used to make the finished film, but only on the physical properties of the finished film produced by a process.

EXAMPLE 7

A film backing was prepared in the same manner described in Example 6, except that the transverse direction draw ratio in the first stretch tower was decreased to 3.2:1, the longitudinal draw ratio in the first stretch tower was increased to 6.1:1, and the longitudinal draw ratio in the second tower was held at 1.5:1. Again in separate operations, the film was two-side corona treated to produce a finished film, and PSA tape samples were prepared from the finished film as described in Example 1. The resultant finished film and tape were tested as described in Example 1. The results are shown in the above Table.

The percentage elongation, secant modulus of elasticity of 1% elongation and break strength for the finished film in the longitudinal direction were 15% (standard deviation 4.2%), $33.1 \times 10^5$ kilopascals (standard deviation $5.7 \times 10^5$ kilopascals), and $16.6 \times 10^4$ kilopascals ($2.9 \times 10^4$ kilopascals), respectively, which resulted in a cutting force for the tape of 7.9 newtons (standard deviation 2.4 newtons) which is lower than the cutting force for the tape of Example 6.

EXAMPLE 8

A polypropylene film was prepared by the tenter process. A homopolymeric isotactic propylene resin having a nominal melt flow index of 2 was fed into the feed hopper of a single screw extruder. The barrel temperatures were adjusted so as to produce a stable, homogeneous melt. The polypropylene melt was extruded through a flat sheet die and cast onto a rotating casting wheel having a surface temperature of 24° C. The sheet was further cooled by a casting wheel that carried the sheet into a water bath maintained at 36° C. The speed of the casting wheel was adjusted so as to produce a cast sheet having a thickness of 0.279 cm. The cast sheet was then passed over a first series of heating rolls maintained internally at about 119° C. to 143° C. and then stretched between two nipped drawing rolls rotating at different speeds to draw the sheet for the first time in a first or longitudinal or machine direction at a draw ratio 5.18:1. The longitudinally oriented sheet was then fed into a tenter with multiple heat zones having temperatures ranging from 160° C. to 175° C. and transversely oriented between two tenter rails at a transverse draw ratio of 6.0:1. The tentered film was then stretched between two heated nipped drawing rolls which are maintained internally at 160° C. and 154° C. respectively, and were rotating at different speeds to longitudinally draw the sheet for a second time at a draw ratio of 1.8:1. The resulting film was 0.005 cm thick, was annealed at 152° C., corona treated on one side, edge trimmed and wound into a master roll.

In a separate operation, film from the master roll was corona treated on the other side, thus producing a two-sided corona treated finished film.

In a separate operation, samples of the finished film were coated on one side with 0.0019 gms per square centimeter of a styrene/isoprene block copolymer adhesive such as that described in U.S. Pat. No. 3,239,478 (incorporated herein by reference) where the polymers contained 15% styrene and the resin was a polymerized mixture of $C_5$ olefins and diolefins with a softening point of 95° C. (measured by ring and ball method, ASTM E-28) and on the other side with a polyvinyl carbamate low adhesion backside (LAB) as described in U.S. Pat. No. 2,532,011. The resulting tape was wound into a jumbo roll. The tape in jumbo roll from was then slit into 1.27 cm widths and wound on 2.54 cm diameter cores for tape testing.

The resultant finished film and tape were then tested in the manner described in Example 1. The results are shown in the above Table.

The percentage elongation, secant modulus of elasticity at 1% elongation and break strength for the finished film in the longitudinal direction were 44.2% (standard deviation 5.9%), $27.6 \times 10^5$ kilopascals (standard deviation $0.7 \times 10^5$ kilopascals), and $28.7 \times 10^4$ kilopascals (standard deviation $2.0 \times 10^4$ kilopascals), respectively, which resulted in a cutting force for tape made from this relatively thick finished film of 10.3 newtons (standard deviation 5.3 newtons), which is similar to the cutting force for Example 1 and the Highland ® Brand 5910 Tape.

COMPARATIVE EXAMPLE

A comparative polypropylene film to be used for a comparative example not made in accordance with the present invention was prepared by the tenter process in the manner described in Example 1 to make the film for the master roll of that Example, except that the polypropylene sheet was cast to produce a 0.0043 centimeter thick comparative polypropylene film. Portions of comparative film (which comparative film was not further longitudinally stretched in the manner described in the second paragraph of Example 1 to make the finished film of that Example) were used to make tape in the same manner tape was made using the finished film in Example 1, and samples of the comparative film and the tape made from the comparative film were tested in the manner described in Example 1. The results obtained were shown in the above Table.

The percentage elongation of the comparative film in the longitudinal direction was about 170% (standard deviation 20.7%) which as substantially higher than the percentage elongation for Example 1 and the other examples of the present invention; and the secant modulus of elasticity at 1% elongation and the break strength of the film in the longitudinal direction were about $10.2 \times 10^5$ kilopascals (standard deviation $2.1 \times 10^5$ kilopascals) and $11.5 \times 10^4$ kilopascals (standard deviation $1.1 \times 10^4$ kilopascals), respectively, which were substantially lower than the secant modulus of elasticity at 1% elongation and break strength for Example 1 and the other examples of the present invention.

Samples of the tape wound on the cores were tested for its dispensing characteristic using the device and method described above with reference to FIGS. 2, 3, 4, and 5. The results obtained are shown in the above Table.

The tape cutting force was about 33.5 Newtons (standard deviation 6.1 newtons) which was over three times the force required to cut the Highland ® Brand 5910 tape and is considered excessively high for tapes that are to be manually dispensed. The tape stretched, necked down and wrinkled before it was finally cut, which is highly undesirable because of the distorted cut tape end portion that results which is unsightly and may not lay flat on a surface to which the tape is adhered. Also, in some cases the newly cut edge of the dispensed piece of tape snapped back onto itself as the cut was made leaving a coiled edge which not only was unsightly, but also could not be adhered to a substrate.

GRAPH OF DATA FROM EXAMPLES

Figure 6:
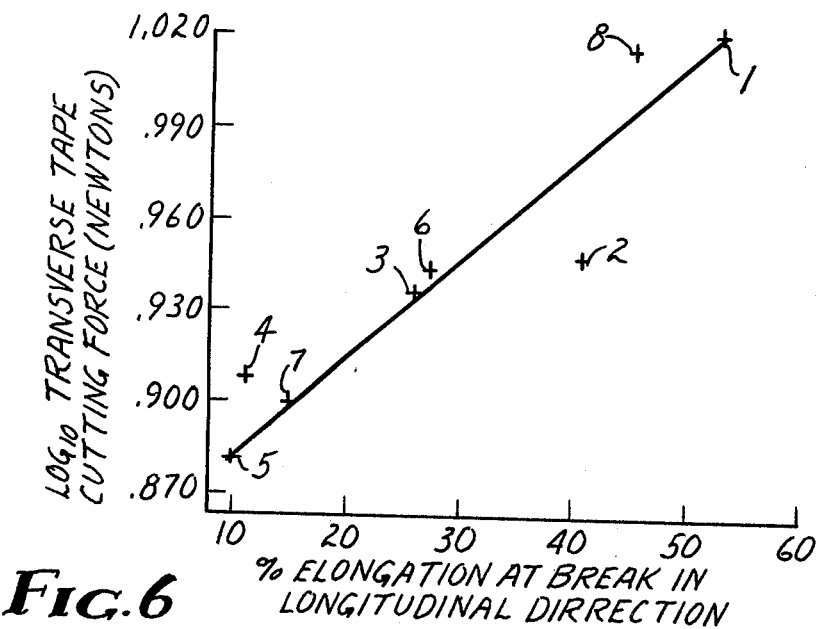
FIG. 6 is a graph of test results from Examples of tapes according to the present invention.

Comparative anaylsis and plotting of the data from the Examples according to the present invention has shown, as is seen in FIG. 6, that there appears to be an approximately linear relationship between the percentage elongation of the finished film in the longitudinal direction at break (shown along the x axis) and the logarithm of the force required to cut tape made from that finished film on the device described with reference to FIGS. 2 through 5 of this application (shown along the y axis). The intersection of these x and y coordinates for each Example is identified by the Example number in FIG. 6.

The graph in FIG. 6 shows that the force required to transversely cut the tape decreases as the percentage elongation of the finished film in the longitudinal direction at break decreases, and from the graph in FIG. 6 it can reasonably be theorized that even lower transverse cutting forces can be attained if the percentage elongation of the finished film in the longitudinal direction is decreased below 10%.

We claim:

1. In a tape comprising a biaxially oriented elongate polypropylene film backing having a thickness of less than about 0.005 centimeters and a layer of adhesive coated on one surface of the backing, the improvement wherein the backing will break before it can be stretched in its longitudinal direction by about 30 percent, and can be stretched by at least 40 percent in its transverse direction before breaking to provide a tape that can be easily manually dispensed from a dispenser.

2. A tape according to claim 1 which can be cut transverse to said longitudinal direction by a force of less than about 13 newtons when tested on the device and according to the method described herein with reference to FIGS. 2, 3, 4 and 5 of this application.

3. A tape according to claim 1 wherein the backing has a secant modulus of elasticity at one percent elongation in its longitudinal direction of at least about $25 \times 10^5$ kilopascals, and will break before it can be stretched in its longitudinal direction by about 25 percent.

4. A tape according to claim 3, which can be cut transverse to said longitudinal direction by a force of less than about 10 newtons when tested on the device and according to the method described herein with reference to FIGS. 2, 3, 4 and 5 of this application.

5. A tape according to claim 1 wherein the backing will break before it can be stretched in its longitudinal direction by about 15 percent.

6. A tape according to claim 5 which can be cut transverse to said longitudinal direction by a force of less than about 8 newtons when tested on the device and according to the method described with reference to FIGS. 2, 3, 4 and 5 of this application.

7. In a sheet material comprising an oriented polypropylene film backing having a thickness of less than about 0.005 centimeters and a layer of adhesive coated on one surface of the backing, the improvement wherein the backing will break before it can be stretched in said first direction by about 30 percent, and which sheet material can be cut transverse to said first direction by a force of less than about 13 newtons when tested on the device and according to the method described herein with reference to FIGS. 2, 3, 4 and 5 of this application.

8. A sheet material according to claim 7 wherein the backing has a secant modulus of elasticity at one percent elongation in said first direction of at least about $25 \times 10^5$ kilopascals, will break before it can be stretched in said first direction by about 25 percent, and can be cut transverse to said first direction by a force of less than about 10 newtons when tested on the device and according to the method described herein with reference to FIGS. 2, 3, 4 and 5 of this application.

9. A sheet material according to claim 7 wherein the backing can be stretched in said second direction by at least about 40 percent before breaking.

10. A sheet material according to claim 7 wherein the backing will break before it can be stretched in said first direction by about 15 percent, and which can be cut transverse to said first direction by a force of less than about 8 newtons when tested on the device and according to the method described herein with reference to FIGS. 2, 3, 4 and 5 of this application.

11. A method for making a tape that can be easily manually dispensed on a tabletop dispenser, comprising the steps of:
forming a biaxially oriented polypropylene film by casting a polypropylene sheet; orienting the cast polypropylene sheet in a direction that will become the longitudinal direction of the backing by stretching the sheet in that direction by a factor of between 3 to 7 times its original length dimension and orienting the sheet in the direction that will become the transverse direction of the backing by stretching the sheet in that direction by a factor of between 3 to 10 times its original width dimension; and again stretching the sheet one or more times in the direction that will become the longitudinal direction of the backing to produce a total stretching factor of 1.5 to 5 times with respect to its length after the first longitudinal and transverse stretching to provide a film that will break before it can be stretched in its longitudinal direction by about 30 percent and can be stretched by at least 40 percent in its transverse direction before breaking; and
coating the film with adhesive.

12. A method according to claim 11 wherein said orienting the cast polypropylene sheet in a direction that will become the longitudinal direction of the backing by stretching the sheet in that direction by a factor of between 3 to 7 times its original length dimension is done prior to said orienting the sheet in the direction that will become the transverse direction of the backing by stretching the sheet in that direction by a factor of between 3 to 10 times its original width dimension.

13. A method according to claim 11 wherein said orienting the cast polypropylene sheet in a direction that will become the longitudinal direction of the backing up stretching the sheet in that direction by a factor of between 3 to 7 times its original length dimension is done simultaneously with said orienting the sheet in the direction that will become the transverse direction of the backing by stretching the sheet in that direction by a factor of between 3 to 10 times it original width dimension.

* * * * *